United States Patent
Alvarez et al.

(10) Patent No.: US 8,033,311 B2
(45) Date of Patent: Oct. 11, 2011

(54) TIRE WITH METAL CABLE ANCHORING REINFORCING MEMBER

(75) Inventors: Denis Alvarez, Clermont-Ferrand (FR); Christian Signoret, Cournon-d'Auvergne (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 1037 days.

(21) Appl. No.: 11/596,516

(22) PCT Filed: May 11, 2005

(86) PCT No.: PCT/EP2005/005085
§ 371 (c)(1), (2), (4) Date: Jul. 27, 2007

(87) PCT Pub. No.: WO2005/113259
PCT Pub. Date: Dec. 1, 2005

(65) Prior Publication Data
US 2008/0066843 A1    Mar. 20, 2008

(30) Foreign Application Priority Data
May 12, 2004  (FR) ..................... 04 05163

(51) Int. Cl.
*B60C 15/00* (2006.01)
*B60C 15/06* (2006.01)

(52) U.S. Cl. ......... 152/547; 152/451; 152/543; 152/550
(58) Field of Classification Search ............ 152/451, 152/539, 540, 543, 547, 550
See application file for complete search history.

(56) References Cited

U.S. PATENT DOCUMENTS

| | | | |
|---|---|---|---|
| 3,996,733 A | | 12/1976 | Holmes |
| 5,024,261 A | * | 6/1991 | Igarashi et al. |
| 5,702,548 A | * | 12/1997 | Arnaud et al. ............... 152/547 |

FOREIGN PATENT DOCUMENTS

| EP | 0 269 036 A | 6/1988 |
|---|---|---|
| EP | 0 744 490 A | 11/1996 |
| EP | 0 751 015 A | 1/1997 |

* cited by examiner

*Primary Examiner* — Adrienne C Johnstone
(74) *Attorney, Agent, or Firm* — Cozen O'Connor (57) ABSTRACT

Tire having a crown, a crown reinforcement, sidewalls and beads, a carcass reinforcement passing into the sidewalls and anchored in the beads. The anchoring is accomplished, in at least one bead, by a circumferential alignment of an anchoring reinforcing member oriented circumferentially and cooperating with a rubber composition. The anchoring reinforcing member is a metal cable having a construction M+N with an inner layer C1 of M wires of diameter $d_1$ wound together in a helix at a pitch $p_1$, this layer C1 being surrounded by an outer layer C2 of N wires of diameter $d_2$ wound together in a helix at a pitch $p_2$. This anchoring cable satisfies ($d_1$, $d_2$, $p_1$ and $p_2$ being expressed in mm): $2 \leq M \leq 4$, $M+3 \leq N \leq M+7$, $0.25 < d_1 < 0.40$, $0.25 < d_2 < 0.40$, $3.5 < p_1 < 7 < p_2 < 14$.

32 Claims, 3 Drawing Sheets

TIRE WITH METAL CABLE ANCHORING REINFORCING MEMBER

RELATED APPLICATION

This is a U.S. National Phase Application under 35 USC 371 of International Application PCT/EP2005/005085, filed on May 11, 2005.

FIELD OF THE INVENTION

The present invention relates to tires and to metal/rubber composites usable for manufacturing tires, in particular their beads enabling these tires to be fixed to a vehicle wheel rim.

BACKGROUND OF THE INVENTION

Patent specification EP-A-582 196 was the first to describe a tire comprising a crown surmounted by a tread, a crown reinforcement, two sidewalls and two beads, a carcass reinforcement passing into the two sidewalls and anchored by means for anchoring in the beads, in which the carcass reinforcement comprises at least one circumferential alignment of reinforcing members (referred to as 'radial') oriented radially, arranged adjacently and practically parallel to one another, aligned circumferentially in at least one circumferential alignment from the beads towards the sidewalls, and in which the anchoring means of these radial reinforcing members comprise at least one circumferentially oriented reinforcing member (referred to as 'anchoring reinforcing member') axially bordering said circumferential alignments of said radial reinforcing members and cooperating with an adjacent portion of the carcass reinforcement by means of an appropriate rubber composition (referred to as 'anchoring rubber'), of great hardness, in contact with the anchoring reinforcing member and the adjacent lengths of the first radial reinforcing members, and transmitting the forces between the radial reinforcing members and the anchoring reinforcing members.

For the detailed description of such tires, which are referred to as "bead-wire-less" because they do not have a conventional solid bead wire, of a relatively large diameter, around which the carcass reinforcement usually winds, reference may also be made, by way of examples, to patent specifications EP-A-664 231, EP-A-664 232, EP-A-664 233 (or U.S. Pat. No. 5,660,656), WO-A-98/54006 or WO-A-2004/009380.

Although this new tire bottom-zone architecture has yielded excellent results, in particular in terms of endurance, it has however been noted that the great rigidity of the beads could cause difficulties when mounting and/or demounting the tires, in particular during manual operations, this problem being particularly true for tires of large dimensions such as for example heavy-vehicle tires.

It will be recalled here that that the conventional mounting process of a "tubeless" tire on a generally integral rim comprising a hollow base consists of passing part of the first bead over the rim flange and placing this part in the hollow base, then passing the rest of the bead over the flange due to slight ovalisation of the corresponding bead of the tire, and repeating the same operation to pass the second bead over the flange of the rim. The mounting is then terminated by a final stage of inflation to a pressure such that it ensures that the beads are put in position on the seats bearing on the rim flanges; during this last stage, the beads may cross "humps" which form an obstacle to the passage of said beads as far as their respective seats and then prevent the risks of unseating.

To overcome this problem of mounting ability, it was proposed first of all, according to what is taught by patent specification EP-A-751 015 (or U.S. Pat. No. 5,702,548), to use anchoring cables of high non-structural elongation, in particular layered cables of construction (2+7) or (3+8), which have undergone a specific heat treatment. These cables, which are said to be of "high-elongation" type, are characterized, before and after curing of the tire, by a particularly high operational elongation (total of their elastic elongation Ae and of their plastic elongation Ap), greater than 4%. However, such an elongation is obtained at the cost of what is called a recovery annealing heat treatment, carried out at a low temperature of between 250° C. and $Ac_1$ (temperature corresponding to a transformation of the crystalline structure of the steel), which has the disadvantage of being relatively complex and expensive.

To overcome this problem of mounting ability, patent application EP-A-1 277 600 did propose another, more economic, solution, consisting of using a rubber composition of reduced rigidity, having an elasticity modulus of between 10 and 20 MPa at a deformation of 10%, and a high creep resistance due to a specific formulation, as anchoring rubber. It is however noted nowadays that a relatively low rigidity of the anchoring rubber can adversely affect somewhat the road behaviour of vehicles fitted with such tires, in particular under sports running conditions; this is the case in particular for top-of-range passenger vehicles, the user of which wishes to have a very high level of road behaviour, in all circumstances, without compromise on safety, in particular on the grip properties, nor on the life of the tires.

In continuing its research, the Applicant discovered a novel solution which makes it possible to improve existing compromises in terms of mounting ability of the tires and road behaviour, without requiring modification of the architecture of the bottom zone of the bead-wire-less tires.

SUMMARY OF THE INVENTION

Consequently, a first subject of the invention relates to a tire comprising a crown surmounted by a tread, a crown reinforcement, two sidewalls and two beads, a carcass reinforcement passing into the two sidewalls and anchored by means for anchoring in the two beads, said anchoring means comprising, in at least one bead, a circumferential alignment of at least one anchoring reinforcing member oriented circumferentially and cooperating with a rubber composition referred to as 'anchoring rubber', this tire being characterized in that said anchoring reinforcing member is a metal cable having two layers of construction M+N comprising an inner layer C1 of M wires of diameter $d_1$ wound together in a helix at a pitch $p_1$, this layer C1 itself being surrounded by an outer layer C2 of N wires of diameter $d_2$ wound together in a helix at a pitch $p_2$, said cable furthermore having the following characteristics ($d_1$, $d_2$, $p_1$ and $p_2$ in mm):

$2 \leq M \leq 4$
$M+3 \leq N \leq M+7$
$0.25 < d_1 < 0.40$;
$0.25 < d_2 < 0.40$;
$3.5 < p_1 < 7 < p_2 < 14$.

Owing to this specific anchoring cable, the beads of the tire of the invention are advantageously ovalisable, that is to say deformable in their plane, under industrially acceptable forces; these beads can be more easily warped, that is to say that their perimeter is more easily deformable, in the axial direction. These properties very substantially improve the ability of the tire of the invention to be ovalised and therefore its mounting ability; thus, it is henceforth possible to use anchoring rubbers of great hardness, which are favourable for road behaviour, without necessarily having to use "high-elongation"-treated cables.

The invention also relates, per se, to the composite comprising the anchoring cable above cooperating with a rubber composition of great hardness. Such a composite comprising at least one metal cable and a diene rubber composition, usable for anchoring a carcass reinforcement in a tire bead, is characterized by the following features:

the rubber composition has, in the vulcanized state, a secant tensile modulus, at 10% elongation, which is greater than 20 MPa;

the metal cable is a cable having two layers M+N such as described above.

The invention also relates to the use of such a composite as a reinforcement structure for articles or semi-finished products made of plastics material and/or rubber, intended in particular for any ground contact system for motor vehicles, such as tires, internal safety supports for tires, wheels, rubber springs, elastomeric joints, other suspension and anti-vibration elements, in particular as a reinforcement structure for the bottom zone of a tire, and also these articles or semi-finished products themselves.

The tires of the invention may be intended for vehicles of passenger-vehicle type, 4×4s, "SUVs" (Sport Utility Vehicles), but also for two-wheeled vehicles such as motorcycles, or for industrial vehicles selected from among vans, "heavy vehicles"—i.e. subway trains, buses, road transport machinery (lorries, tractors, trailers), off-road vehicles -, agricultural machinery or construction machinery, aircraft and other transport or handling vehicles.

I. DEFINITIONS AND TESTS

I-1. Definitions

In the present application, the following are understood to mean in known manner:

"axial": a direction parallel to the axis of rotation of the tire; this direction may be "axially inner" when it is directed towards the inside of the tire and "axially outer" when it is directed towards the outside of the tire;

"bead": the portion of the tire adjacent radially internally to the sidewall and the base of which is intended to be mounted on a rim seat of a vehicle wheel;

"diene elastomer (or inaccurately rubber)": an elastomer resulting at least in part (that is to say a homopolymer or a copolymer) from diene monomer(s) (monomer(s) bearing two double carbon-carbon bonds, whether conjugated or not);

"essentially saturated diene elastomer": a diene elastomer resulting at least in part from conjugated diene monomers, having a content of members or units of diene origin (conjugated dienes) which is less than 15% (mole %);

"essentially saturated diene elastomer": a diene elastomer resulting at least in part from conjugated diene monomers, having a content of members or units of diene origin (conjugated dienes) which is greater than 15% (mole %);

"highly unsaturated diene elastomer": a diene elastomer of the essentially saturated type, having a content of members or units of diene origin (conjugated dienes) which is greater than 50% (mole %);

"isoprene elastomer": an isoprene homopolymer or copolymer, in other words a diene elastomer selected from among the group consisting of natural rubber (NR), synthetic polyisoprenes (IR), the various isoprene copolymers and mixtures of these elastomers;

"sidewall": the portion of the tire, most frequently of low flexural strength, located between the crown and the bead;

"radial": a direction passing through and perpendicular to the axis of rotation of the tire; this direction may be "radially inner" or "radially outer" according to whether it is directed towards the axis of rotation of the tire or towards the outside of the tire;

"reinforcement element" or "reinforcing member": equally well monofilaments and multifilaments, or assemblies such as cables, plied yarns or any other equivalent type of assembly, whatever the material and the treatment of these reinforcing members, for example surface treatment or coating such as rubber-coating, or alternatively pre-sizing in order to promote adhesion to the rubber;

"circumferentially oriented reinforcing member" or "circumferential reinforcing member": a reinforcing member oriented substantially parallel to the circumferential direction of the tire, that is to say forming with this direction an angle which does not deviate by more than five degrees from the circumferential direction;

"radially oriented reinforcing member" or "radial reinforcing member": a reinforcing member contained substantially within one and the same axial plane or within a plane forming with an axial plane an angle less than or equal to 10 degrees.

I-2. Tests

A) Dynamometric Measurements

As regards the wires and metal cables, the measurements of breaking load Fm (maximum load in N), tensile strength Rm (in MPa) and elongation at break At (total elongation in %) are carried out under tension in accordance with Standard ISO 6892 of 1984.

As regards the rubber compositions, the modulus measurements are carried out under tension, unless indicated otherwise in accordance with Standard ASTM D 412 of 1998 (test piece "C"): the true secant moduli (or Young's moduli), reduced to the real section of the test piece at 10% elongation, referred to as E10 and expressed in MPa, are measured in a second elongation (that is to say after an accommodation cycle) (normal conditions of temperature and humidity in accordance with Standard ASTM D 1349 of 1999).

B) Static Creep Test

The so-called "static creep" test is a test in which test pieces of rubber composition the useful part of which has a length of 70 mm, a width of 5 mm and a thickness of 2.5 mm (these test pieces are cut from vulcanized sheets of a thickness of 2.5 mm) are prepared; the test pieces are placed in an oven at 150° C. and a 3 kg weight is immediately hung from them; the test is thus carried out with an initial stress of:

$$\sigma_0 = \frac{Mg}{S_0} = 2.35 \text{ MPa}$$

where M is: weight applied, g is: gravity acceleration and $S_0$ is: initial section of the test piece being measured; the elongation of the useful part of the test piece is measured as a function of time; the "amount of static creep" corresponds to the variation of deformation over a given time, for example between 3 and 5 hours' testing:

$$\tau = \frac{\Delta \varepsilon}{\Delta t}$$

where: $\Delta\varepsilon = \varepsilon(t_2) - \varepsilon(t_1)$: variation in the deformation measured during $\Delta t = t_2 - t_1$ in minutes (min).

C) Rheometry Test

The "rheometry" test is an alternating shearing test at a deformation of ±0.2 degrees, a frequency of 100 cycles/min., a temperature of 197° C. and a duration of 10 min (rheometer from Monsanto). The test is carried out on a disc of uncured rubber composition, the change in the torque resulting from the shearing imposed between the two faces of the disc over the min. is recorded and the change in the torque after the maximum measured is noted: if the torque measured remains stable, there is no reversion, that is to say, reduction in the stiffness of the test piece; if the torque measured decreases, there is reversion. The phenomenon of reversion results in a reduction in the rigidity of the test piece under the test conditions; it is therefore a test of the thermal stability of the mix at high temperature.

$$r = \frac{C_{max} - C_{10}}{C_{max}} \times 100$$

denotes the amount of reversion at the end of the test; $C_{max}$ is the maximum torque measured and $C_{10}$ is the torque measured after 10 min.

II. DETAILED DESCRIPTION OF THE INVENTION

The tire of the invention comprises, as anchoring means for its carcass ply reinforcement, a rubber matrix or composition (referred to as anchoring rubber) with which specific layered cables (referred to as anchoring cables) cooperate, as explained in detail below.

In the present description, unless expressly indicated otherwise, all the percentages (%) indicated are mass %.

II-1. Rubber Composition

The composition comprises at least one diene elastomer and all the conventional constituents such as reinforcing filler, cross-linking system and other additives, as described hereafter.

A) Diene Elastomer

The diene elastomers, in known manner, may be classed in two categories, those referred to as essentially unsaturated and those referred to as essentially saturated. Thus, for example, butyl rubbers or copolymers of dienes and of alpha-olefins of the EPDM type fall within the definition of essentially saturated diene elastomers (low or very low content of units of diene origin which is always distinctly less than 15%).

Although it is applicable to any type of diene elastomer, the person skilled in the art of tires will readily understand that the present invention is preferably used with diene elastomers of the highly unsaturated type.

The diene elastomer is in particular selected from among the group consisting of polybutadienes (BR), natural rubber (NR), synthetic polyisoprenes (IR), the various butadiene copolymers, the various isoprene copolymers and mixtures of these elastomers. Such copolymers are more preferably selected from the group consisting of butadiene/styrene copolymers (SBR), whether the latter be prepared by emulsion polymerization (ESBR) or by solution polymerization (SSBR), isoprenelbutadiene copolymers (BIR), isoprene/styrene copolymers (SIR) and isoprene/butadiene/styrene copolymers (SBIR).

More preferably at least one isoprene elastomer is used, even more preferably natural rubber or a synthetic polyisoprene of the cis-1,4 type; of these synthetic polyisoprenes, preferably polyisoprenes having a content (mole %) of cis-1,4 bonds greater than 90%, more preferably still greater than 98%, are used.

The isoprene elastomer may be used on its own or in a blend with other diene elastomers, in particular SBR and/or BR elastomers such as those mentioned above, whether or not the isoprene elastomer be present in a majority proportion among all the diene elastomers used.

Thus, according to a specific embodiment of the invention, it is possible to use for example, in a blend with the isoprene elastomer (in particular natural rubber), an SBR copolymer having a Tg (glass transition temperature, measured in accordance with ASTM D3418) of preferably between −70° C. and −10° C., whether it be prepared in emulsion (ESBR) or in solution (SSBR), in a proportion of 0 to 70 phr (parts by weight per hundred parts of elastomer), the remainder (namely 30 to 100 phr) being constituted by the isoprene elastomer. In that case, more particularly an SSBR is used. There may also be associated with said SBRs a BR having preferably more than 90% (mole %) of cis-1,4 bonds, said BR having a Tg preferably between −110° C. and −50° C.

Finally, the diene elastomer(s) may be used in association with any type of synthetic elastomer other than a diene elastomer, or even with polymers other than elastomers, for example thermoplastic polymers.

B) Other Constituents

The rubber composition also comprises all or some of the additives usually used in rubber matrices intended in particular for the manufacture of the bottom zones of tires, such as for example reinforcing fillers such as carbon black or inorganic fillers such as silica, inorganic-filler coupling agents, anti-aging agents, antioxidants, plasticising agents or extender oils, whether the latter be aromatic or non-aromatic in nature (in particular oils which are only very slightly or not aromatic, for example of naphthenic or paraffinic type, of high or preferably low viscosity, MES or TDAE oils), agents which facilitate processing (processability) of the compositions in the uncured state, stearamides, tackifying resins, a cross-linking system based on either on sulfur, or on sulfur and/or peroxide donors, vulcanization accelerators, activators or retarders, anti-reversion agents such as for example sodium hexathiosulfonate or N,N'-m-phenylene-biscitraconimide, methylene acceptors and donors, reinforcing resins, bismaleimides, known adhesion-promoting systems of the type "RFS" (resorcinol/formaldehyde/silica) or metal salts, in particular cobalt or nickel salts.

The person skilled in the art will be able, in the light of the present description, to adjust the formulation of the rubber composition in order to achieve the desired levels of rigidity (elasticity modulus), and to give excellent high-temperature creep resistance and very good high-temperature stability.

The creep resistance is essential in obtaining solid and durable anchoring of the carcass reinforcements in the beads and the high-temperature thermal stability is also important owing to the very harsh thermal conditions to which some tire beads may be subjected during operation, in particular those for heavy-vehicle tires, whether road tires or not.

Thus, preferably, the anchoring rubber withstands without breaking a static creep stress at 150° C. under an initial stress of 2.35 MPa for at least 5 hours; more preferably, its amount of static creep at 150° C. under an initial stress of 2.35 MPa remains less than $2\times10^{-3}$/min for between 3 and 5 hours' applied stress. On the other hand and preferably, said rubber has an amount of reversion, after 10 min at 197° C., which is less than 10% and more preferably less than 5%.

The cross-linking system is preferably a vulcanization system based on sulfur and a vulcanization accelerator. Any compound capable of acting as a vulcanization accelerator for the diene elastomers in the presence of sulfur may be used, in particular those selected from among the group consisting of 2-mercaptobenzothiazyl disulfide (abbreviated to "MBTS"), N-cyclohexyl-2-benzothiazyl sulfenamide (abbreviated to "CBS"), N,N-dicyclohexyl-2-benzothiazyl sulfenamide (abbreviated to "DCBS"), N-tert. butyl-2-benzothiazyl sulfenamide (abbreviated to "TBBS"), N-tert. butyl-2-benzothiazyl sulfenimide (abbreviated to "TBSI") and mixtures of these compounds. Preferably a primary accelerator of sulfenamide type is used.

To this vulcanization system there are added, incorporated during the first, non-productive, phase and/or during the productive phase, various known secondary accelerators or vulcanization activators such as zinc oxide, stearic acid, guanidine derivatives (for example diphenylguanidine), etc.

The sulfur is used in a preferred amount of between 3 and 15 phr (parts by weight per hundred parts of elastomer), more preferably of between 5 and 12 phr. The primary vulcanization accelerator, for example a sulfenamide, is used in a preferred amount of between 0.5 and 7 phr, more preferably of between 1 and 5 phr.

The amount of reinforcing filler, for example carbon black or reinforcing inorganic filler such as silica, is preferably greater than 50 phr, for example of between 60 and 140 phr. It is more preferably greater than 70 phr, for example between 70 and 120 phr.

Suitable carbon blacks are all the carbon blacks, in particular blacks of the type HAF, ISAF and SAF, conventionally used in tires (what are called tire-grade blacks). Of the latter, reference will more particularly be made to the reinforcing carbon blacks of series 100, 200 or 300 (ASTM grades), such as, for example, the blacks N115, N134, N234, N326, N330, N339, N347, N375, or alternatively, depending on the intended applications, the blacks of higher series (for example N660, N683, N772).

Suitable reinforcing inorganic fillers are in particular mineral fillers of siliceous type, in particular silica ($SiO_2$), or of aluminous type, in particular alumina ($Al_2O_3$). The silica used may be any reinforcing silica known to the person skilled in the art, in particular any precipitated or fumed silica having a BET surface area and a CTAB specific surface area both of which are less than 450 m²/g, preferably from 30 to 400 m²/g. As highly dispersible precipitated silicas (referred to as "HD"), mention will be made of for example the silicas Ultrasil 7000 and Ultrasil 7005 from Degussa, the silicas Zeosil 1165MP, 1135MP and 1115MP from Rhodia, the silica Hi-Sil EZ150G from PPG, and the silicas Zeopol 8715, 8745 and 8755 from Huber. Examples of reinforcing aluminas are the aluminas "Baikalox" "A125" or "CR125" from Baikowski, "APA-100RDX" from Condea, "Aluminoxid C" from Degussa or "AKP-G015" from Sumitomo Chemicals.

For coupling the diene elastomer to the reinforcing inorganic filler, if applicable, a coupling agent (or bonding agent) which is at least bifunctional which is intended in known manner to provide a sufficient chemical and/or physical connection between the inorganic filler (surface of its particles) and the diene elastomer, in particular bifunctional organosilanes or polyorganosiloxanes, is used.

In the tire and composite according to the invention, the rubber composition has the preferred characteristic of having, in the vulcanized state, a secant tensile modulus, at 10% elongation (E10), which is greater than 20 MPa, more preferably greater than 30 MPa. It is within these ranges of rigidity, in particular between 40 and 70 MPa, that the best compromise of performance has been observed.

In the case of the greater rigidities, the rubber composition may advantageously comprise an additional reinforcing resin consisting for example of a methylene acceptor such as a phenol-formaldehyde resin, in a preferred amount of between 3 and 15 phr, more preferably of between 5 and 12 phr, and a methylene donor such as hexamethylenetetramine ("HMT") or alternatively hexamethoxymethylmelamine ("HMMM", also referred to as "H3M"), in a preferred amount of between 1 and 10 phr, more preferably of between 3 and 7 phr.

II-2. Layered Cable (M+N)

The layered cable of the tire and of the composite according to the invention is a metal cable having two layers of construction M+N comprising a core or inner layer (C1) of M wires of diameter $d_1$ wound together in a helix at a pitch $p_1$, this layer C1 itself being surrounded by an outer layer (C2) of N wires of diameter $d_2$ wound together in a helix at a pitch $p_2$, this cable furthermore having the following characteristics ($d_1$, $d_2$, $p_1$ and $p_2$ in mm):

$2 \leq M \leq 4$
$M+3 \leq N \leq M+7$
$0.25 < d_1 < 0.40$;
$0.25 < d_2 < 0.40$;
$3.5 < p_1 < 7 < p_2 < 14$.

All the above characteristics are of course measured when the cable is at rest and its axis rectilinear.

"Metal cable" is understood here by definition to mean a cable formed of wires made majoritarily (that is to say to more than 50% of these wires) or fully (for 100% of the wires) of a metallic material.

The wires of layers C1 and C2 may have a diameter which is identical or different from one layer to the other. Preferably wires of the same diameter from one layer to the other (i.e. $d_1 = d_2$) are used, in particular to simplify the cabling process, as shown, for example, in the appended FIGS. 3 and 4.

It will be recalled here that in known manner the pitch "p" represents the length, measured parallel to the axis of the cable, at the end of which a wire having this pitch makes a complete turn around said axis of the cable.

Using different pitches $p_1$ and $p_2$ means that, in known manner, the wires of the layers C1 and C2 are essentially arranged in two cylindrical (or tubular), adjacent and concentric layers, such that, at least in the cable at rest, the thickness of the outer layer C2 is substantially equal to the diameter of the wires which constitute it; as a result, the cross-sections of the inner layer C1 and of the outer layer C2, like that of the cable, have an outer enveloping surface or a contour (E1 and E2 respectively in FIGS. 3 and 4) which is substantially circular.

The cables having cylindrical or tubular layers of the invention must in particular not be confused with so-called "compact" layered cables, which are assemblies of wires wound with the same pitch and in the same direction of twist; in such cables, the compactness is such that practically no distinct layer of wires is visible; as a result, the cross-section of such cables has a contour which is no longer circular, but polygonal.

Preferably, the layers C1 and C2 are wound in the same direction of twist (either S/S or Z/Z), which has the significant advantage of minimizing the contact pressure between the wires.

According to a preferred embodiment of the invention, the layer C2 comprises from 6 to 10 wires (i.e. $6 \leq N \leq 10$), more preferably still from 7 to 9 wires (i.e. $7 \leq N \leq 9$). The relationship $M+4 \leq N \leq M+6$ is advantageously satisfied.

According to another preferred embodiment, for better ability of the cables to be penetrated by the anchoring rubber, the outer layer C2 is a tubular layer of N wires referred to as "unsaturated" or "incomplete", that is to say that, by definition, there is sufficient space in this tubular layer C2 to add at least one (N+1)th wire of diameter $d_2$, several of the N wires possibly being in contact with each other. Reciprocally, this tubular layer C2 would be referred to as "saturated" or "complete" if there was not sufficient space in this layer to add at least one (N+1)th wire of diameter $d_2$.

Of the preferred cables which are usable, mention will be made particularly of cables of constructions 2+6, 2+7, 2+8, 3+7, 3+8, 3+9, 4+8, 4+9 or 4+10, in particular those formed of wires having substantially the same diameter from one layer to the other (i.e. $d_1=d_2$). According to a more preferred embodiment of the invention, the selected cable has the construction M+5 (its outer layer C2 comprises 5 wires more than its inner layer C1); in other words, the cable of the composite of the invention is selected more particularly from among cables of constructions 2+7, 3+8 and 4+9.

Figure 3:
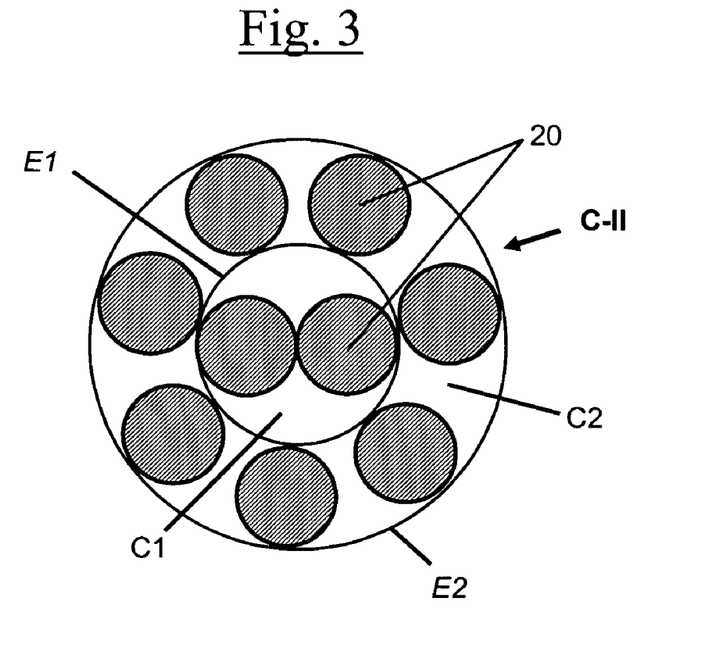
FIG. 3 shows a cross-section of cables of constructions 2+7 usable in the anchoring zone.
Figure 4:
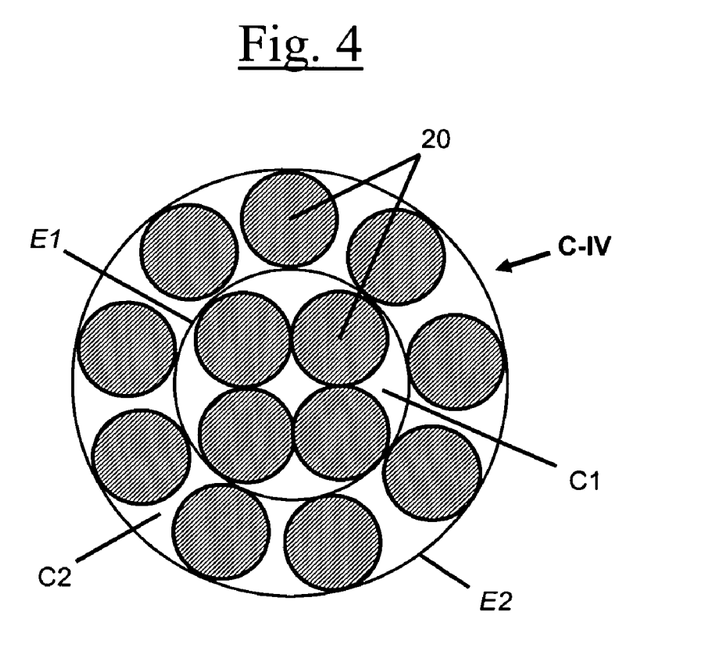
FIG. 4 shows a cross-section of cables of constructions 4+9 usable in the anchoring zone.

FIGS. 3 and 4 show, in a section perpendicular to the axis of the cable (assumed to be rectilinear and at rest), two examples of such preferred 2+7 cables (cable denoted C-II in the following examples) and 4+9 (cable denoted C-IV in the following examples), respectively. The inner layer C1, which is formed of two or four wires 20 wound together in a helix at a pitch $p_1$, is itself surrounded by and in contact with an outer layer C2 of seven or nine wires 20 wound together in a helix at a pitch $p_2$, and therefore of a thickness substantially equal to the diameter $d_2$ of said wires. It can clearly be seen that the wires are thus arranged in two adjacent, concentric, tubular layers (layer C1 of contour E1, and layer C2 of contour E2).

According to another preferred embodiment of the invention, the following characteristics are satisfied ($d_1$, $d_2$, $p_1$ and $p_2$ in mm):

$0.30<d_1<0.40$;
$0.30<d_2<0.40$;
$4<p_1<7$ and $8<p_2<14$.

It is within these narrow ranges of diameters $d_1$ and $d_2$ on one hand, of short pitches $p_1$ and $p_2$ on the other hand, that the best compromise of performances has been obtained. More preferably still, for these same reasons, the following relationships are satisfied ($p_1$ and $p_2$ in mm):

$4.5 \leq p_1 \leq 6.5$ and $8.5 \leq p_2 \leq 13.5$.

The total elongation at break (At) of the cable, the total of its structural, elastic and plastic elongations (At=As+Ae+Ap), is preferably greater than 2.5%, more preferably greater than 3.0%, even more preferably greater than 3.5%.

In the tire or the composite according to the invention, the present anchoring cable could be high-elongation treated, to impart thereto an operational elongation Af (Af=Ae+Ap) of greater than 4%, preferably greater than 5%, more preferably still greater than 6%. It will be recalled that such a treatment may consist of a heat treatment by Joule effect, by static convection or alternatively by induction, performed directly on the cable, as described in the aforementioned application EP-A-751 015.

The invention is preferably carried out with a steel cable, more preferably one made of perlitic (or ferrito-perlitic) carbon steel hereinafter referred to as "carbon steel", or alternatively of stainless steel (by definition, steel comprising at least 11% chromium and at least 50% iron) such as are described for example in applications EP-A-648 891 or WO-A-98/41682. However, it is of course possible to use other steels or other alloys.

The metal or steel used, be it in particular a carbon steel or a stainless steel, may itself be coated with a metallic layer which improves for example the processing properties of the metal cable and/or its constituent elements, or the use properties of the cable and/or of the composite and/or of the tire themselves, such as the properties of adhesion, corrosion resistance or alternatively aging resistance.

According to a preferred embodiment, the steel used is covered with a layer of brass (Zn—Cu alloy) or of zinc; it will be recalled that during the process of manufacturing the wires, the brass or zinc coating facilitates the drawing of the wire, as well as the sticking of the wire to the rubber. However, the wires could be covered with a fine metal layer other than brass or zinc, having for example the function of improving the corrosion resistance of these wires and/or the adhesion thereof to the rubber, for example a fine layer of Co, Ni, Al, or of an alloy of two or more of the compounds Cu, Zn, Al, Ni, Co, Sn.

When the cables of the composites of the invention are used for reinforcing beads of bead-wire-less tires, they are preferably made of carbon steel and have a tensile strength (Rm) greater than 2000 MPa.

The person skilled in the art will know how to manufacture carbon steel wires having such strength, by adjusting in particular the composition of the steel and the final work-hardening ratios of these wires, according to his own particular needs, using for example micro-alloyed carbon steels containing specific alloying elements such as Cr, Ni, Co, V, or various other known elements (see for example *Research Disclosure* 34984—"Micro-alloyed steel cord constructions for tires"—May 1993; *Research Disclosure* 34054—"High tensile strength steel cord constructions for tires"—August 1992).

When a carbon steel is used, its carbon content is preferably of between 0.1% and 1.2%, in particular between 0.5% and 1.1%. It is more preferably of between 0.6% and 1.0% (% by weight of steel), such a content representing a good compromise between the mechanical properties required for the composite and the feasibility of the wires.

The cable presently described might be provided with an external wrap, formed for example of a single wire, whether or not of metal, wound in a helix about the cable in a pitch shorter than that of the outer layer, and a direction of winding opposite or identical to that of this outer layer. However, owing to its specific structure, the cable of the invention, which is already self-wrapped, does not generally require the use of an external wrapping wire, which advantageously solves the problems of wear between the wrap and the wires of the outermost layer of the cable.

The above cables with layers M+N are manufactured using cabling devices and using processes well-known to the person skilled in the art which are not described here in order to simplify the description. Owing to the different pitches $p_1$ and $p_2$, they require two successive operations (manufacture of the first, inner, layer C1 then cabling of the second, outer, layer around this layer C1), these two operations possibly advantageously being effected in-line using two cablers (for example Barmag cablers) arranged in series.

II-3. Composite and Tire of the Invention

The composite of the invention may be of varied forms, for example in the form of a ply, band, strip or series of strips, other blocks of rubber of varied forms and dimensions according to the intended applications, in which are incorporated or with which cooperate the two-layer cables previously described.

In this composite, the definitive adhesion between the metal and the rubber composition is obtained in known manner on emerging from the curing of the finished article, for example the tire, comprising the composite. Preferably this curing is effected under pressure.

As described previously, the composite of the invention may advantageously constitute part of a bead zone of a tire devoid of conventional solid bead wire, which tire itself is in accordance with the invention, said part of the bead zone being intended to anchor the carcass reinforcement of said bead-wire-less tire.

Such a bead-wire-less tire, such as that described for example in terms of its general construction in the aforementioned documents EP-A-582 196, EP-A-664 231, EP-A-664 232, EP-A-664 233, WO-A-98/54006 or WO-A-2004/009380, generally comprises a crown surmounted by a tread, a crown reinforcement, a carcass reinforcement passing into the sidewalls and rejoining two beads designed to be mounted on the wheel rim of a vehicle. Said carcass reinforcement comprises first reinforcing members (or "radial reinforcing members") arranged adjacent and practically parallel to one another, aligned circumferentially in at least one circumferential alignment from at least one of said beads towards one of said sidewalls and anchored in said bead, the latter comprising an anchoring zone for holding the carcass reinforcement and comprising at least one second reinforcing member ("anchoring reinforcing member" or "anchoring cable") oriented circumferentially and cooperating with an adjacent portion of the carcass reinforcement by means of a rubber composition (or "anchoring rubber") in contact with the anchoring reinforcing member and the adjacent lengths of the first radial reinforcing members. The tire of the present invention is characterized in that the anchoring cable is as defined in section II-2 above.

The radial reinforcing members above are for example textile cabled yarns made of polyester (for example PET HMLS), PEN, rayon or other cellulose, nylon, aramid or alternatively of hybrid material (for example aramid/nylon).

Figure 1:
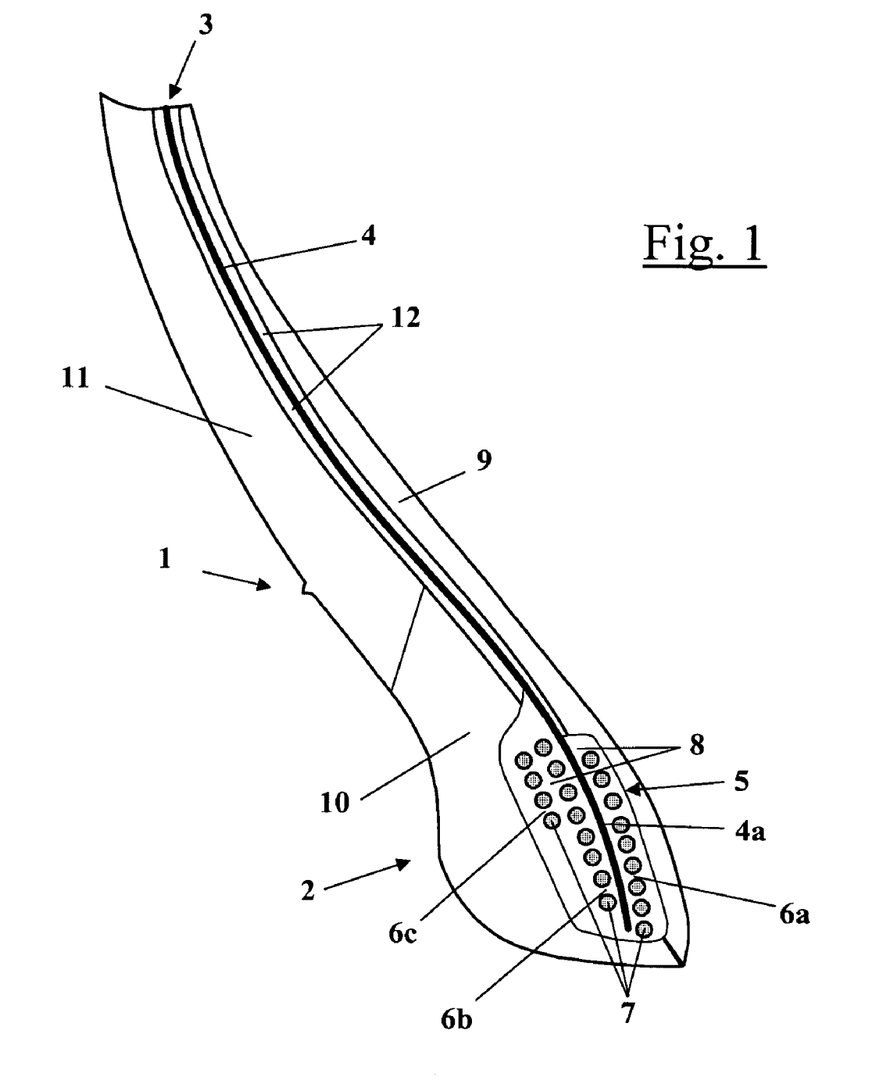
FIGS. 1 and 2 show two embodiments in partial cross-section depicting essentially a bottom zone of a bead-wireless tire, comprising in particular in its bead 2 an anchoring zone 5 of a carcass reinforcement 4.

By way of non-limitative example, there are depicted in FIG. 1, in partial cross-section, a bead and a sidewall of such a tire according to the invention, in which the conventional anchoring, by turning up the carcass reinforcement about a solid bead wire, is replaced, it may be recalled, by an arrangement in which circumferential anchoring cables are arranged adjacent to the structure of radial reinforcing members, the whole being embedded in a rubber mix or anchoring rubber.

This tire comprises a sidewall 1 adjacent to a bead 2. A carcass reinforcement 3 extends circumferentially from the bead 2 towards the sidewall 1 and comprises in the example illustrated a circumferential alignment of first radial reinforcing members 4. This carcass reinforcement 3 may be arranged continuously from one bead to the other, passing through the sidewalls and the crown of the tire, or alternatively it may comprise two or more parts, arranged for example along the sidewalls, in particular without covering all of the crown. The radial reinforcing members 4, for example in this case textile cabled yarns of PET HMLS, are oriented radially in the beads and the sidewalls and are anchored in an anchoring zone 5 of the bead 2.

According to a specific embodiment of the invention, the anchoring zone 5 comprises three circumferential windings or "stacks" 6a, 6b and 6c of second reinforcing members or anchoring cables 7, arranged on either side of the length 4a of the adjacent first radial reinforcing members 4, said stacks 6a, 6b and 6c cooperating with an anchoring rubber 8 in which they are incorporated.

This anchoring rubber 8 completely covers the length 4a of the radial reinforcing members 4, and the circumferential windings or stacks 6a, 6b and 6c of the anchoring cables 7, so as to produce a solid structure capable of transmitting the mechanical operating stresses between the length 4a of the radial reinforcing members 4 in the anchoring zone 5 of the bead 2 and the circumferential windings, in particular of transmitting the forces to which the first reinforcing members 4 are subjected due to the inflation pressure of the tire. The stacks 6 may be produced for example by juxtaposition of a plurality of different circumferential cable elements 7, or by winding (substantially at zero degrees) one and the same cable 7 in a spiral, the turns of course being non-contiguous in any case. The anchoring cable 7 is for example a cable of construction 2+7 such as described in section II-2 above and illustrated in FIG. 3. The total number of these cables or windings of the same cable lies for example within a range from 15 to 30 approximately, for the three stacks 6a, 6b and 6c together.

By way of example, the average inter-cable (or inter-winding) distance is of the order of 0.3 mm, the average inter-stack distance (between stacks 6b and 6c in this FIG. 1) is of the order of 0.5 mm and the minimum distance (to avoid any direct contact between the textile and metal) between the length 4a and each of the two stacks 6a and 6b is of between 0.5 and 0.8 mm.

Axially internally relative to the circumferential winding of anchoring cable 6a, there is a conventional rubber mix 9 as "internal rubber", the known function of which is to provide tightness of the inside of the tire casing. Axially externally relative to the circumferential winding of anchoring cable 6c, there is a protective mix 10, then, radially externally, a sidewall mix 11 which gradually replaces it. Radially externally to the anchoring zone 5, the radial reinforcing members 4 of the carcass reinforcement 3 are in direct contact with a mix 12.

The first reinforcing members 4 of this tire bead are therefore in contact with two different rubber mixes, the anchoring rubber 8 in the anchoring zone 5 and the mix 12 radially to the outside. The preferred mechanical characteristic of the anchoring rubber is an elasticity modulus (E10) greater than 20 MPa, whereas the mix 12 has a lesser rigidity, with a modulus of between 3 and 10 MPa.

In the anchoring zone 5 of the bead 2, the anchoring rubber 8 is the sole rubber mix in contact with the first 4 and second 7 reinforcing members. This anchoring rubber imparts to this structure excellent mechanical resistance to the forces to which it is subjected upon inflation of the tire and during travel.

Of course, only one possible example of anchoring structure of the bottom zone of a tire according to the invention is shown in FIG. 1.

The person skilled in the art will readily understand that a large number of other variants are possible, for example anchoring zones 5 comprising only two anchoring stacks 6a and 6b, one on either side of the length 4a of the radial reinforcing members 4, or more than three stacks.

Figure 2:
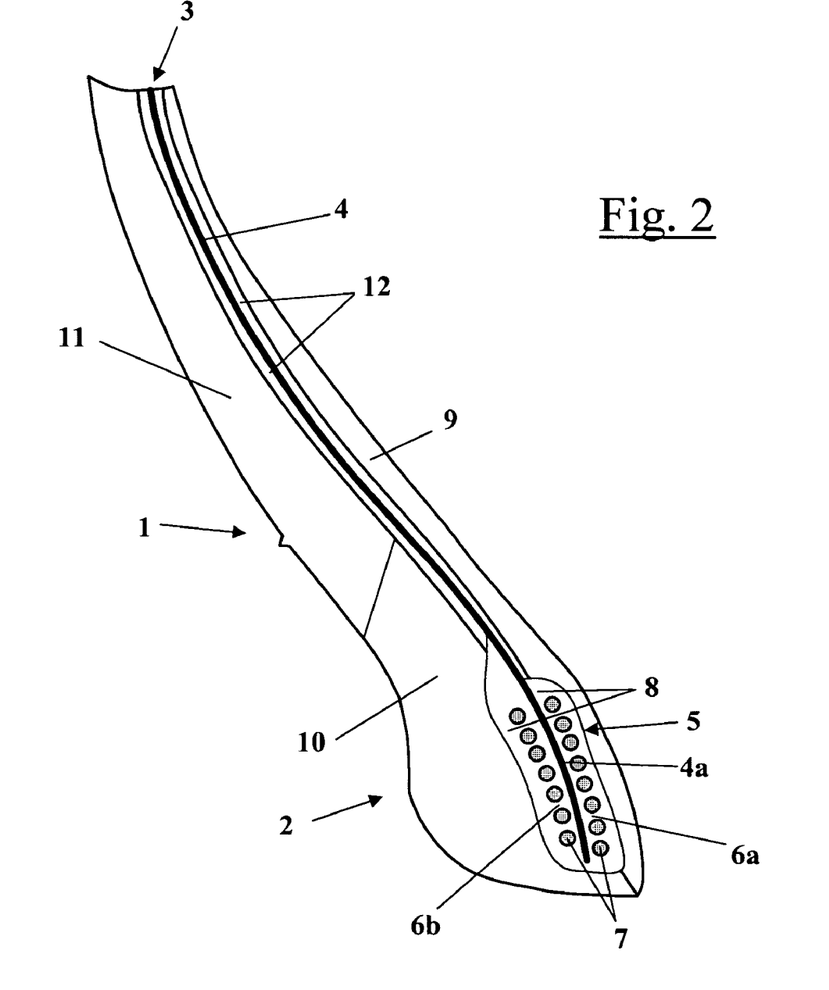

FIG. 2 depicts a partial cross-section through another example of a tire according to the invention, the anchoring zone 5 of which comprises the same anchoring rubber 8 but only two stacks 6a and 6b of anchoring cable 7. The anchoring cable 7 is a cable of construction 4+9 such as described in section II-2 above and illustrated in FIG. 4. The total number of cables or windings of the same cable lies for example within a range from 10 to 25 approximately, for the two stacks 6a and 6b together.

By way of example, the average inter-cable (or inter-winding) distance 7 is of the order of 0.3 mm and the minimum distance between the length 4a and each of the two stacks 6a and 6b is of between 0.5 and 0.8 mm.

Other possible variant embodiments of the tire of the invention will consist for example of using a plurality of lengths 4a of radial reinforcing members 4 in the anchoring zone 5 of the bead 2, or a plurality of alignments 4 of radial reinforcing members in the same carcass reinforcement 3, including in the sidewall 1, or even alternatively a plurality of carcass reinforcements 3 in this sidewall 1.

Another possible variant embodiment will consist of non-linear anchoring such as described in the aforementioned application WO-A-2004/009380.

In another possible variant embodiment of the invention, taken alone or in combination with at least one of the variants previously described, the individual radial reinforcing members 4 could of course be replaced by groupings of several parallel radial reinforcing members, grouped together for example in the form of rubberized strips comprising said radial reinforcing members, as described for example in application EP-A-919 406.

In non-limitative manner, it should be noted that the tires according to the invention may advantageously be manufactured using a process which does not involve any, or only a few, transformations of forms in the uncured state. For example, the blank of the future tire can be assembled on a rigid core which imposes the form of its inner cavity. There are applied to this core, in the order required by the final architecture, all the individual constituents of the tire, which are arranged directly in their final position, no portion of the tire later being displaced or folded over against another, as is generally the case in conventional assembly methods. This manufacture may in particular use the devices described in patent specifications EP-A-243 851 (or U.S. Pat. No. 4,795, 523) for laying the radial reinforcing members of the carcass reinforcement and EP-A-264 600 (or U.S. Pat. No. 4,963, 207) for laying the rubbers or rubber compositions. The tire can then be molded and vulcanized as set forth for example in patent specification EP-A-242 840 (or U.S. Pat. No. 4,895, 692).

III. EXAMPLES OF EMBODIMENT OF THE INVENTION

III-1. Anchoring Cables

To produce examples of embodiment in accordance with the invention, there are used hereafter cylindrical layered cables of preferred constructions 2+7 and 4+9 such as depicted in FIGS. 3 and 4, formed of fine carbon steel wires coated with brass.

The carbon steel wires are prepared in known manner, starting, for example, from machine wires (diameter 5 to 6 mm) which are first of all work-hardened, by rolling and/or drawing, to an intermediate diameter close to 1 mm, or alternatively starting directly from commercial intermediate wires, the diameter of which is close to 1 mm. The steel used is a carbon steel of the high-strength type (referred to as HT for "High Tensile"), the carbon content of which is approximately 0.82%, comprising approximately 0.5% manganese, the remainder consisting of iron and the usual inevitable impurities linked to the manufacturing process for the steel (for example, contents of silicon: 0.25%; phosphorus: 0.01%; sulfur: 0.01%; chromium: 0.11%; nickel: 0.03%; copper: 0.01%; aluminium: 0.005%; nitrogen: 0.003%).

The wires of intermediate diameter undergo a degreasing and/or pickling treatment, before their subsequent transformation. After depositing a brass coating on these intermediate wires, what is called "final" work-hardening is effected on each wire (i.e. after the final heat treatment of patenting), by cold-drawing in a wet medium with a drawing lubricant which is for example in the form of an aqueous emulsion or dispersion.

The wires thus prepared, all of a diameter of approximately 0.35 mm, have the following mechanical properties:

| | |
|---|---|
| Breaking load: | 265 N; |
| Young's modulus: | 210 GPa; |
| Tensile strength: | 2790 MPa; |
| Elongation at break: | 2.2% (Ae = 1.4% + Ap = 0.8%). |

These wires are then assembled in the form of different cylindrical layered cables, referenced C-I to C-V, the construction and the mechanical properties of which are given in Table 1.

TABLE 1

| Cable | Construction | $p_1$ (mm) | $p_2$ (mm) | Fm (daN) | Rm (MPa) | At (%) | Af (%) |
|---|---|---|---|---|---|---|---|
| C-I | 2 + 7 | 7.5 | 15.0 | 196 | 2275 | 5.3 | 5.2 |
| C-II | 2 + 7 | 5.0 | 10.0 | 215 | 2425 | 3.4 | 3.2 |
| C-III | 4 + 9 | 7.5 | 15.0 | 280 | 2210 | 5.9 | 5.7 |
| C-IV | 4 + 9 | 5.0 | 10.0 | 305 | 2275 | 3.8 | 3.5 |
| C-V | 4 + 9 | 5.0 | 10.0 | 275 | 2105 | 6.5 | 6.2 |

The cables of construction [2+7], which are non-wrapped (without an external wrapping wire), are formed of a total of 9 wires. They comprise an inner layer C1 of 2 wires wound together in a helix (S direction) at the pitch $p_1$, this layer C1 being in contact with a cylindrical outer layer of 7 wires which themselves are wound together in a helix (S direction) around the core, at the pitch $p_2$.

The cables of construction [4+9], which are also non-wrapped, are formed of a total of 13 wires. They comprise an inner layer C1 of 4 wires wound together in a helix (S direction) at the pitch $p_1$ this layer C1 being in contact with a cylindrical outer layer of 9 wires which themselves are wound together in a helix (S direction) around the core, at the pitch $p_2$.

By way of examples, the appended FIGS. 3 and 4, which have already been commented on previously, depict diagrammatically a cross-section through these layered cables of construction 2+7 and 4+9, respectively, such cables possibly being in accordance with or not in accordance with the invention in this general representation.

Cables C-I and C-III have conventional long pitches $p_1$ and $p_2$ ($p_1$=7.5 mm and $P_2$=15 mm) which therefore do not satisfy the pitch characteristics advocated by the invention. As the aforementioned application EP-A-751 015 teaches, they underwent a recovery annealing heat treatment in order to impart thereto an operational elongation Af of greater than 4.0%.

Cables C-II and C-IV have short pitches $p_1$ and $p_2$ ($p_1=5$ mm; $P_2=10$) which meet the demands of the invention. They are therefore usable in the composite and the tire of the invention, without requiring "high-elongation" treatment, unlike the control cables C-I and C-III. The total elongation At of these cables C-II and C-IV is advantageously greater than 3.0%.

For comparison, the cable C-V, which is of the same construction as the cable C-IV and therefore also suitable for the composite and tire of the invention, furthermore underwent a high-elongation treatment, which imparts thereto an operational elongation Af and total elongation At which are very high, since both are greater than 6.0%. This treatment consisted of heating the cable continuously during its travel, by induction under a protective atmosphere (for example hydrogen); the heating time was approximately 0.1 second, and the treatment temperature was 450° C. After the heating, the cable was cooled in a protective atmosphere ($H_2$) and then wound on a spool.

It is furthermore noted that all the cables C-II, C-IV and C-V advantageously satisfy the following preferred relationships ($d_1$, $d_2$, $p_1$ and $p_2$ in mm):
0.30<$d_1$=$d_2$<0.40;
4.5≦$p_1$≦6.5;
8.5≦$p_2$≦13.5.

III-2. Anchoring Rubber

For the following tests, the anchoring cables C-I to C-IV previously described were associated with one and the same anchoring rubber of high rigidity (modulus E10 equal to approximately 55 MPa).

This anchoring rubber is a known composition based on diene elastomer (50/50 blend of NR and of SSBR having a Tg of approximately −50° C.), and of carbon black (approximately 75 phr) as reinforcing filler. Furthermore, it essentially comprises an antioxidant (approximately 2 phr), a reinforcing resin (approximately 10 phr of phenol-formaldehyde resin and 5 phr of methylene donor H3M), a metal salt (approximately 4 phr of cobalt naphthenate) as promoter of adhesion with respect to the metal, and finally a vulcanization system (approximately 9 phr of sulfur, 1.5 phr of accelerator, 9 phr of ZnO and 1.5 phr of stearic acid).

III-3. Comparative Tests on Tires

The cables and anchoring rubbers above are used as anchoring structures for a carcass reinforcement of bead-wire-less tires having a radial carcass, of dimension 225/45 R17 (speed index Y), which are conventionally manufactured and identical in all points except for the construction of their anchoring zones 5.

These tires comprise in known manner a crown surmounted by a tread, a crown reinforcement and, referring now for example to the numbering of FIG. 1 or 2, two sidewalls 1 and two beads 2, a carcass reinforcement 3 which passes into the two sidewalls 2 and is anchored by means of anchoring means 5 (6a, 6b, 6c, 8) in the two beads 2. The carcass reinforcement 3 comprises at least one circumferential alignment of radial reinforcing members 4, which are arranged adjacent and practically parallel to one another, aligned circumferentially in at least one circumferential alignment from at least one of said beads 2 towards one of said sidewalls 1. The means 5 (6a, 6b, 6c, 8) for anchoring said radial reinforcing members 4 in at least one bead 2 comprise at least one circumferentially oriented anchoring cable 7, axially bordering said circumferential alignments of the radial reinforcing members 4 and cooperating with an adjacent portion of the carcass reinforcement 3 by means of an anchoring rubber 8 in contact with the anchoring cable 7 and the adjacent lengths 4a of the first radial reinforcing members 4. The anchoring cables 7 used in these tires are the cables C-I to C-IV of Table 1.

The tires corresponding to the cables C-I to C-IV are designated P-I to P-IV respectively. They comprise more precisely a bottom zone such as depicted in FIG. 1 with regard to the anchoring cable C-II (with 3 anchoring stacks 6a, 6b and 6c comprising in total 21 windings of cable 7), or in FIG. 2 with regard to the anchoring cable C-IV (with only 2 anchoring stacks 6a and 6b comprising in total 15 windings of cable 7). In each of the anchoring stacks 6, the windings 7 are arranged in a circumferential direction, parallel to one another, distant from one other by approximately 0.3 mm.

These tires P-I to P-IV, whether mounted or not on a rim of appropriate dimension according to the type of analysis carried out, were tested under static and dynamic conditions, on different rolling machines or other tests, in order to compare their performance in terms of the criteria defined below.

A) Endurance During Travel of Long Duration:

The endurance during travel is assessed by a running test of very long duration (40,000 km) on an automatic rolling machine, under a very heavy load (overload compared with the rated load) and at the same speed, for a predefined number of kilometers. If the tire reaches the end of the test without being destroyed, a maximum mark of 100 is assigned thereto; if not, its mark is reduced in proportion to the mileage traveled before destruction.

B) Endurance During High-speed Travel:

The endurance during high-speed travel is assessed by subjecting each tire to a gradual increase in speed, in given stages, up to a limit speed set beforehand (greater than 300 km/h). If the tire reaches the end of the test without being destroyed, a maximum mark of 100 is assigned thereto; if not, its mark is reduced in proportion to the mileage traveled before destruction.

C) Mounting Ability (Ability to be Ovalised):

A mounting ability test is carried out in which the tire (not mounted on its rim) is gradually radially loaded to assess its ability to be ovalised, that is to say its deformability in its own plane.

The test is deliberately carried out under very harsh deformation conditions, until the structure of the bead buckles and at least one permanent deformation (bump visible to the naked eye) appears on the outside of the bottom zone of the tire. The higher the critical loading threshold, in other words the deflection withstood, the better is the deformability and the flexural strength of the bottom zone of the tire. A relative value of 100 is used for the control tire acting as a reference for the test (here, tire P-I), and a higher value indicates an improved performance. All the results obtained in these different tests have been summarized in Table 2 below.

TABLE 2

| Tire:<br>Anchoring cable: | P-I<br>C-I | P-II<br>C-II | P-III<br>C-III | P-IV<br>C-IV |
|---|---|---|---|---|
| Endurance during travel of long duration: | 100 | 100 | 100 | 100 |
| Endurance during high-speed travel: | 100 | 100 | 100 | 100 |
| Mounting ability: | 100 | 150 | 104 | >200 |

It will be noted first of all that the tires P-II and P-IV according to the invention exhibit at least the same endurance during travel as the control tires (P-I and P-III).

However, particularly, and surprisingly, a result which is very substantially improved with regard to the mounting ability is observed for the tires of the invention, compared with the control tires the anchoring structure of which however uses cables of high elongation, which are high-elongation treated and which are therefore distinctly more expensive.

The tire P-II already exhibits a performance improved by 50%, whereas the tire P-IV, the anchoring structure of which uses the preferred cable C-IV of construction 4+9, unexpectedly exhibits a deformability which is even more distinctly improved, no permanent deformation having been observed, even under maximum loading of the tire.

It will furthermore be noted that that the tires of the invention can be more easily warped, that is to say that their perimeter is more easily deformable, in the axial direction.

These unexpected results can be attributed to the specific construction of the anchoring cables of the tires of the invention, in particular to their very short assembly pitches, within the ranges of values advocated.

The operations of mounting and demounting the tires according to the invention, in particular on/from a monobloc wheel, can thus be carried out more simply and more quickly. It is henceforth possible to use anchoring rubbers of great hardness, which are favourable for road behaviour, without necessarily having to use "high-elongation" treated cables. Supplementary rolling tests have furthermore clearly demonstrated that the tires P-II and P-IV according to the invention offered improved road behaviour, compared with tires according to the invention using the same anchoring cables with short pitches but an anchoring rubber of lesser rigidity (modulus E10 of the order of approximately 15 MPa).

The invention claimed is:

1. A tire comprising a crown surmounted by a tread, a crown reinforcement, two sidewalls and two beads, a carcass reinforcement passing into the two sidewalls and anchored by anchoring means in the two beads, said anchoring means comprising, in at least one bead, a circumferential alignment of at least one anchoring reinforcing member oriented circumferentially and cooperating with a rubber composition referred to as 'anchoring rubber',
   wherein said anchoring reinforcing member is a metal cable having two layers of construction M+N comprising an inner layer C1 of M wires of diameter $d_1$ wound together in a helix at a pitch $p_1$, this layer C1 itself being surrounded by an outer layer C2 of N wires of diameter $d_2$ wound together in a helix at a pitch $p_2$, and
   wherein said metal cable satisfies the following characteristics where $d_1$, $d_2$, $p_1$ and $p_2$ are expressed in mm:
   $2 \leq M \leq 4$
   $M+3 \leq N \leq M+7$
   $0.25 < d_1 < 0.40$;
   $0.25 < d_2 < 0.40$;
   $3.5 < p_1 < 7 < p_2 < 14$.

2. The tire according to claim 1, in which the wires of the layers C1 and C2 are of identical diameter ($d_1 = d_2$).

3. The tire according to claim 1, in which the layers C1 and C2 of the layered cable are wound in the same direction of twist.

4. The tire according to claim 1, in which the outer layer C2 comprises from 6 to 10 wires.

5. The tire according to claim 4, in which the outer layer C2 comprises from 7 to 9 wires.

6. The tire according to claim 1, in which the outer layer C2 is an unsaturated layer.

7. The tire according to claim 1, in which the layered cable is selected from among those of constructions 2+6, 2+7, 2+8, 3+7, 3+8, 3+9, 4+8, 4+9 and 4+10.

8. The tire according to claim 7, in which the layered cable is selected from among those of constructions 2+7, 3+8 and 4+9.

9. The tire according to claim 8, in which the layered cable has the construction 4+9.

10. The tire according to claim 1, in which the layered cable has the following characteristics:
    $0.30 < d_1 < 0.40$;
    $0.30 < d_2 < 0.40$;
    $4.0 < p_1 < 7$ and $8 < p_2 < 14$.

11. The tire according to claim 10, in which the layered cable has the following characteristics:
    $4.5 \leq p_1 \leq 6.5$ and $8.5 \leq p_2 \leq 13.5$.

12. The tire according to claim 1, the metal of the metal cable being steel.

13. The tire according to claim 12, the steel being a carbon steel.

14. The tire according to claim 13, the carbon steel having a carbon content of between 0.1% and 1.2%.

15. The tire according to claim 14, the carbon steel having a carbon content of between 0.5% and 1.1%.

16. The tire according to claim 15, the carbon steel having a carbon content of between 0.6% and 1.0%.

17. The tire according to claim 1, the total elongation at break (At) of the cable being greater than 2.5%.

18. The tire according to claim 17, wherein the total elongation at break (At) is greater than 3.0%.

19. The tire according to claim 18, wherein the total elongation at break (At) is greater than 3.5%.

20. The tire according to claim 1, the operational elongation (Af) of the cable being greater than 4.0%.

21. The tire according to claim 20, wherein the operational elongation (Af) is greater than 5.0%.

22. The tire according to claim 21, wherein the operational elongation (Af) is greater than 6.0%.

23. The tire according to claim 1, in which the anchoring rubber comprises at least one diene elastomer selected from the group consisting of polybutadienes, natural rubber, synthetic polyisoprenes, butadiene copolymers, isoprene copolymers and mixtures of these elastomers.

24. The tire according to claim 23, in which the diene rubber is selected from the group consisting of natural rubber, synthetic polyisoprenes, isoprene copolymers and mixtures of these elastomers.

25. The tire according to claim 24, in which the diene rubber is majoritarily natural rubber.

26. The tire according to claim 23, in which the diene rubber is a mixture of natural rubber and synthetic diene elastomer.

27. The tire according to claim 26, in which the synthetic diene elastomer is selected from the group consisting of polybutadienes, butadiene/styrene copolymers and mixtures of these elastomers.

28. The tire according to claim 1, in which the anchoring rubber has, in the vulcanized state, a secant tensile modulus E10, at 10% elongation, which is greater than 20 MPa.

29. The tire according to claim 28, in which the anchoring rubber has a modulus E10 greater than 30 MPa.

30. The tire according to claim 29, in which the anchoring rubber has a modulus El0 of between 40 and 70 MPa.

31. The tire according claim 1, in which the anchoring rubber comprises a reinforcing resin.

32. The tire according to claim 31, the reinforcing resin being formed of a methylene acceptor and a methylene donor.

* * * * *